United States Patent [19]
Vogelsang

[11] Patent Number: 5,261,513
[45] Date of Patent: Nov. 16, 1993

[54] HYDRODYNAMIC RETARDER

[75] Inventor: Klaus Vogelsang, Crailsheim, Fed. Rep. of Germany

[73] Assignee: J.M. Voith GmbH, Fed. Rep. of Germany

[21] Appl. No.: 973,068

[22] Filed: Nov. 6, 1992

[30] Foreign Application Priority Data

Nov. 8, 1991 [DE] Fed. Rep. of Germany ....... 4136759

[51] Int. Cl.⁵ .................... B60T 10/02; F16D 57/00
[52] U.S. Cl. .................................. 188/290; 188/274
[58] Field of Search ............... 188/290, 291, 292, 293, 188/294, 295, 296, 264 E, 274; 60/337, 330; 192/4 B

[56] References Cited

U.S. PATENT DOCUMENTS

| | | | |
|---|---|---|---|
| 4,440,272 | 4/1984 | Bieber | 188/290 |
| 4,474,270 | 10/1984 | Vogelsang | 188/296 |
| 4,715,481 | 12/1987 | Brosius | 188/291 |
| 5,101,941 | 4/1992 | Long et al. | 188/290 |

FOREIGN PATENT DOCUMENTS

| | | |
|---|---|---|
| 2150115 | 10/1973 | Fed. Rep. of Germany . |
| 2706950 | 4/1979 | Fed. Rep. of Germany . |
| 2855654 | 6/1980 | Fed. Rep. of Germany . |
| 3545658 | 6/1987 | Fed. Rep. of Germany . |

Primary Examiner—Douglas C. Butler
Attorney, Agent, or Firm—Baker & Daniels

[57] ABSTRACT

A hydrodynamic retarder for a vehicle has a primary part and a secondary part. The primary part has an input end connectable to the transmission output shaft of the vehicle and an output end connectable to the axle drive shaft. The fixed secondary part is, relative to the primary part, sealed against fluid discharge. A temperature sensor is provided for sensing the temperature of a working medium contained in the working circuit. A control system coordinated with a control valve is provided for adjusting by the cooling volume flow passed to the heat exchanger a specific temperature value of the working medium which has remained in the working circuit (set value). The set value of the temperature is so selected that it corresponds to a specific, desired braking moment.

4 Claims, 2 Drawing Sheets

HYDRODYNAMIC RETARDER

BACKGROUND OF THE INVENTION

The invention concerns a hydrodynamic retarder for a vehicle, such as an automobile. The hydrodynamic retarder is of the type having a primary part having an input end which can be connected to the transmission output shaft of the vehicle. The output end can be connected to the axle drive shaft of the vehicle. The retarder has a fixed secondary part which, relative to the primary part, is sealed against fluid discharge. The primary and secondary parts are under formation of a working space provided with feed lines and drain lines while forming a working circuit in which a working medium flows. A cooling circuit carries the cooling volume flow, with a heat exchanger incorporated into it and, as the case may be, with additional cooling and energy storing capacities, moreover with a control valve for controlling the volume flow in the outlet line.

In particular, the invention concerns the design of the control and regulating part of such a retarder in view of the desired braking moment.

DE 35 45 658 describes a hydrodynamic retarder of the general type described in the first paragraph above. Concerned here is the design of the retarder as a maximally compact, self-supporting unit. Incorporated in the inlet and outlet of the working circuit is a control valve each by which the filling and emptying of the working space, and thus the braking moment, are controlled. DE 21 50 115 concerns a control system for a hydrodynamic retarder. Provided in the cooling circuit is a switching valve for interruption of the cooling circuit and emptying of the working space as the brake is deactivated. To achieve short response times of the brake in filling and emptying, along with a high braking output, this document provides for a hydraulic receiver which is followed by a charging valve.

Underlying DE 27 06 950 is the problem of providing a retarder where the progression of the brake moments curve can be adjusted with maximally simple means. To that end it is proposed to provide the cooling circuit line with an injector type constriction at the emptying point of the replenishing line.

DE 28 55 654 is based on a retarder whose degree of filling is adjustable for adjustment of the braking moment, according to a variable set value by means of an overflow valve arranged in the outlet line, with the movable valve element of this overflow valve being adjustable by a pressure force generated by the fluid pressure in the outlet line. To accurately adjust the hydrodynamic braking moment to a set value it is proposed to control the magnitude of the opposing force by means of a controller.

DE 35 11 795 concerns as well a retarder where point a, the braking force, is effective without interruption down to low speeds. This retarder operates with two independent working circuits, which involves a high design expense.

DE 31 13 408 also concerns a hydrodynamic retarder, where the brake moments curve is to be achieved by radial, relative displacement of rotor and stator.

Most of these prior retarders have the disadvantage of high design expense. With most retarders, furthermore, the outlet choke is exclusively geared to achieving a specific operating point in the characteristic diagram of the retarder. The outlet choke with its rigidly fixed cross section assumes a relatively high share of the entire flow resistance. The remaining flow resistance is formed of individual resistances, composed of the resistances of the lines carrying the coolant, the resistance of one or several heat exchangers and additional cooling or energy absorption capacities.

Experience shows that the braking values at operating start are distinctly lower than after a certain period of operation. This effect is enhanced or prolonged by additional cooling or energy capacities. Therefore, the integration of such a retarder in the operational brake system, for instance in the mechanical friction brake of a modern truck equipped with antilock brakes, is not possible. Furthermore, the highest output valve is achieved in the operating point, though, but not the maximally possible volume flow, since due to the fixed adjustment of the outlet choke and due to the control to a constant braking moment the pumping effect of the retarder rotor is reduced as well at increasing speed of rotation. This is attributable to the reduction of the circuit charge.

Therefore, the problem underlying the invention is to design a retarder in such a way that a desired braking moment is cleanly adjustable at any desired point in time, i.e., also at the start of the braking operation, and that the working mapping of the retarder can be configured independently of the point in time of operational start.

SUMMARY OF THE INVENTION

This problem is solved by the features of the present invention. The inventor has recognized most of all the influence of the temperature of the working fluid, generally an oil. Initial braking is unsatisfactory because the oil is still cold and has a high viscosity. The inventional measures eliminate this influence, because with a cold working medium only the relatively slight volume share of the necessary working medium remains in the working circuit; a larger share of working medium leaves the working circuit only after a predetermined operating temperature has been reached, whereby the actual — external — cooling circuit is put in operation.

The necessary circuit volume amounting to about 10-15% of the entire volume, a relatively quick temperature increase of the working medium, and thus a fast-acting retarder, can be accomplished. The present invention provides the advantage of a shorter time response, since thermally, and thus limited in terms of time, relatively little circuit volume needs to be replenished. Another advantage is that the effect of the initial braking with a cold working medium and minimized circuit volume is considerably raised by a high heating gradient and shortened response time. A further advantage is that operating points with maximum retarder output can be utilized better with an enhanced charge with increased volume flows utilizing the existing options of the retarder rotor as a pump The present invention, in one form thereof comprises a hydrodynamic retarder, preferably for an automobile, with a primary part whose input end can be connected to the transmission output shaft of the vehicle and its output end to the axle drive shaft of the vehicle. A fixed secondary part, relative to the primary part, is sealed against fluid discharge. The primary part and secondary part are under formation of a working space provided with feed lines and drain lines while forming a working circuit in which a working medium flows. A cooling circuit carries the cooling volume flow, with a heat exchanger incorporated in it and, as the case may be, with additional cooling- and energy-storing capacities; moreover with a control valve for controlling the volume flow in the outlet line. A temperature sensor is provided for sensing the temperature of the working medium contained in the working circuit. A control system coordinated with the control valve is provided for adjusting by means of the cooling volume flow passed to the heat exchanger a specific temperature value (set value) of the working medium which has remained in the working circuit. The set value of the temperature is so selected that it corresponds to a specific, desired braking moment.

BRIEF DESCRIPTION OF THE DRAWINGS

The invention and the prior art will be more fully explained with the aid of the drawings.

DETAILED DESCRIPTION OF THE PREFERRED EMBODIMENT

Figure 1:
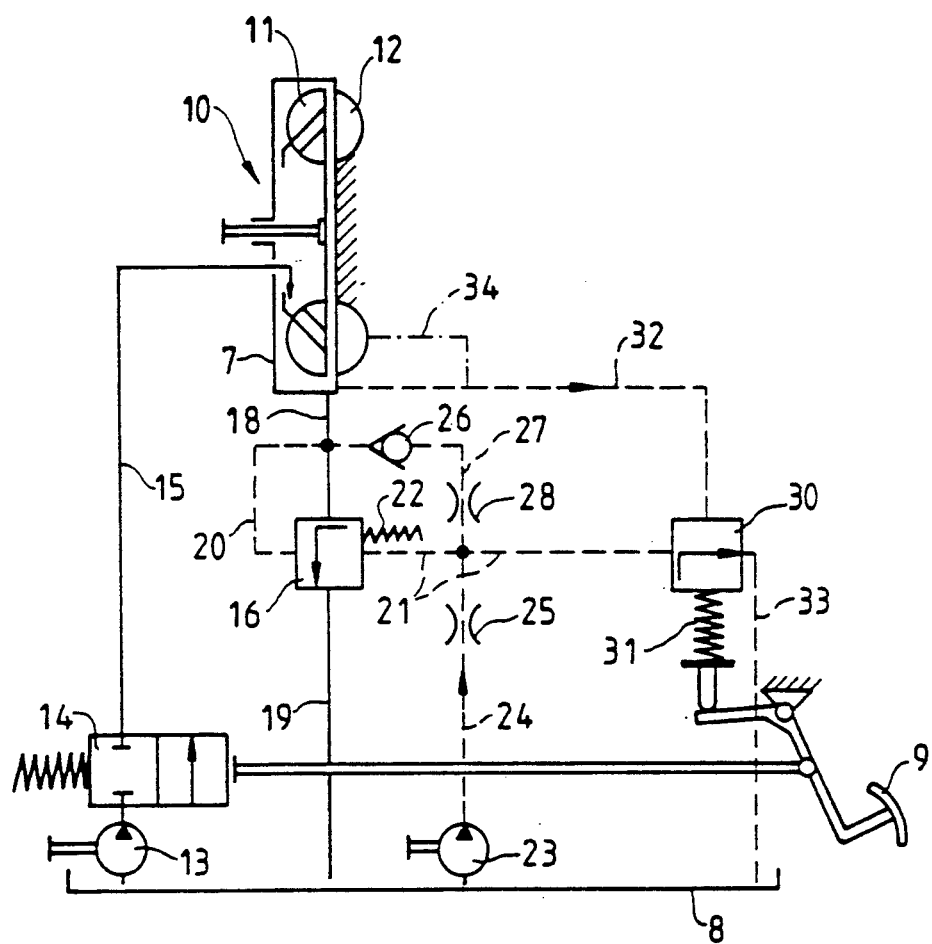
FIG. 1 shows the control diagram of a hydrodynamic brake according to the prior art.

FIG. 1 shows the housing 7, rotor 11 and stator 12 of a hydrodynamic brake 10. The charging of the brake takes place by means of a charging pump 13 via a charging valve 14 and a charging line 15. Upon braking instruction, triggered by pressing the braking pedal 9, the charging valve 14 is fully opened immediately.

The brake 10 is emptied via an outlet line 18, 19 in which the overflow valve 16 is arranged. A control line 20 symbolically illustrates that the fluid pressure prevailing in the part 18 of the outlet line acts on the one end face of the movable valve element of the overflow valve 16, and at that, in the "opening" direction. An opposite force acts on the opposite end face in the "closing" direction, by means of a pressure fluid supplied via the control line 21 and, as required, by means of a spring 22. In reality, a pressure space exists in the area of this end face between the valve element and the valve housing. The supply of the control line 21 (and thus of the pressure space) with pressure fluid takes place either by means of an auxiliary pump 23 via line 24 with a choke 25, or from the outlet line 18 via a check valve 26 and a line 27 with a choke 28.

The overflow valve 16 is controlled by a control valve 30 connected to the control line 21 as follows: A specific set value is preselected on the brake pedal 9 by its deflection. A spring 31 acting on the control valve 30 in the "opening" direction converts this deflection to a set force. Responding to a braking instruction, the spring 31 at first keeps the control valve 30 closed; the overflow valve 16 remains thereby closed as well because the opposite force — generated by the pressure in the control line 21 and by the spring 22 — surmounts the force generated by the fluid pressure in the outlet line 18 (control line 20). Hence the degree of charging increases in the brake 10, causing the pressure in the brake to rise. A measuring pressure line 32 then passes a pressure — to be kept constant — from the brake 10 to the control valve 30, on the movable valve element of which latter this pressure counteracts the force of the spring 31. Dependent upon the degree by which the force generated from this pressure surmounts the force of the spring 31 adjusted by the brake lever 9, the control line 21 is relieved more or less; that is, more or less connected to the relief line 33 emptying into a low-pressure region, for instance a sump 8. The opposite force acting on the valve element of the overflow valve 16 is thereby reduced to a degree such that by a controlled opening of the overflow valve 16 the pressure in the brake outlet line 18 will be adjusted, which is necessary to reach the desired measuring pressure in the line 32, and thus the desired braking moment.

The measuring pressure line 32 may be hooked to the housing of the brake 10 or, as indicated at 34 by dash-dot line, in the area of the stator 12 directly to the torus-shaped working space of the brake. The purpose of the two chokes 25 and 28 is to allow the control valve 30 to reduce the pressure in the control line 21 as required, despite the constant replenishing of pressure fluid through the lines 24 and 27.

Figure 2:
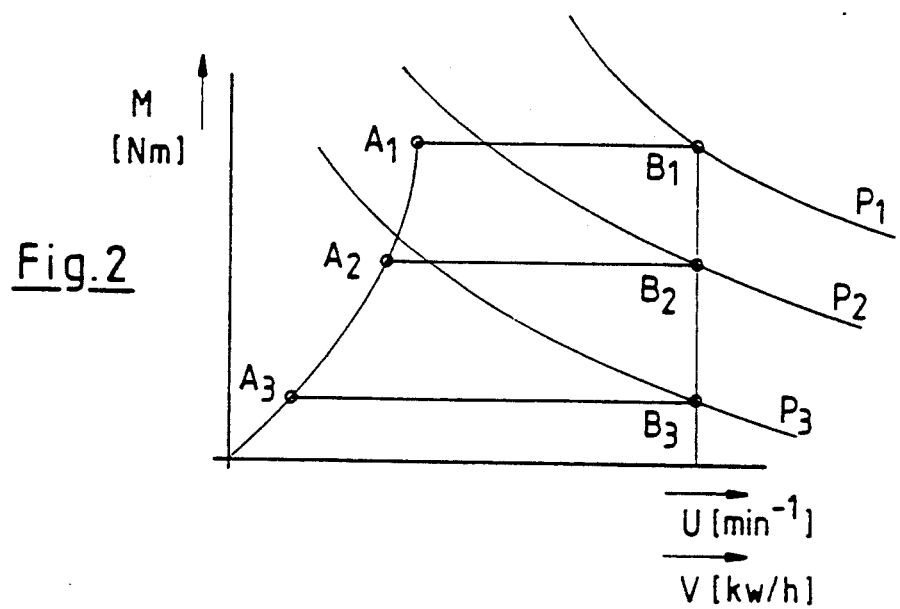
FIG. 2 shows a desired working mapping of a retarder.
Figure 3:
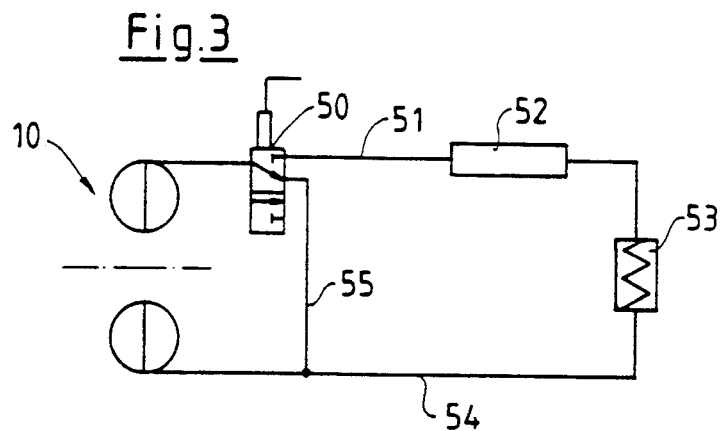
FIG. 3 shows the piping diagram of a retarder according to a first embodiment.
Figure 4:
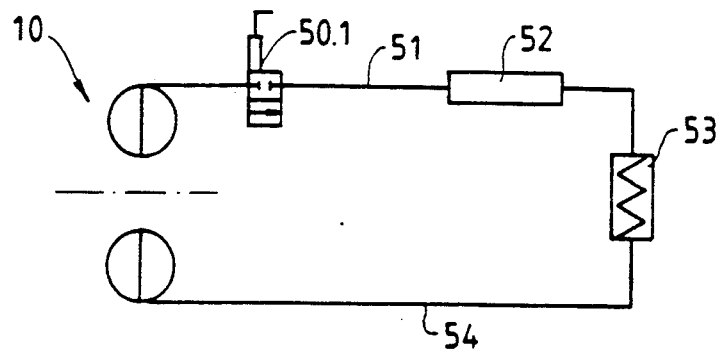
FIG. 4 shows the piping diagram of a retarder according to a second embodiment.

FIG. 2 shows a desired working mapping of a retarder. FIG. 3 and 4 show each a retarder 10, a cooling circuit comprising a line 51, an energy storage capacity 52, a heat exchanger 53 and line 54.

The retarder according to FIG. 3 has a pressure control. A continuously adjustable 3/2-way valve is used here dividing the volume flow of the working circuit, depending on preselected temperature, in such a way that the working medium, when at low temperature, will via bypass (shunt) be returned directly to the working circuit, uncooled, and channeled into the cooling circuit wholly or partly only after reaching the set temperature. As can be seen, a bypass line 55 is provided between the 3/2-way valve 50 and the line 54.

The retarder according to FIG. 4 is one with a pressure-independent moment control. A continuously adjustable 2/2-way valve is provided here; the bypass line according to FIG. 3 is absent. With this solution, due to the pressure-independent moment control, a continuously adjustable 2/2-way valve is sufficient. In the case of a significant variation from the set value, due to low temperature, the retarder outlet is blocked in order for the retarder circuit volume to quickly reach set temperature, and is then completely or partly channeled into the cooling circuit for energy removal.

The control valves may be actuated pneumatically, mechanically or electromechanically. The temperature in the working circuit is controlled by means of an electronic evaluation unit to a preselected maximum temperature value through a quick temperature sensor (not shown) which measures the temperature in the working circuit.

For the sake of completeness it is mentioned that the temperature value must not necessarily be adjusted to a fixed level and thus be constant over time; it may be varied appropriately in contingence on braking stages or also retarder speed of rotation (travel speed) or other parameters.

What is claimed is:

1. A hydrodynamic retarder for a vehicle, said vehicle having a transmission output shaft and an axle drive shaft, said hydrodynamic retarder comprising:
   a primary part having an input end and an output end,
      said input end being connectable to the transmission output shaft of the vehicle, and said output end being connectable to the axle drive shaft of the vehicle;

a fixed secondary part, said secondary part being sealed against fluid discharge relative to said primary part; said primary and secondary parts being under formation of a working space having feed lines and drain lines while forming a working circuit in which a working medium flows, with a cooling circuit carrying a cooling volume flow, and including a heat exchanger incorporated therein and a control valve for controlling the volume flow in a drain line;

a temperature sensor contained in the working circuit for sensing the temperature of the working medium; and control means coordinated with the control valve for adjusting by means of the cooling volume flow passed to the heat exchanger a specific selected temperature value of the working medium which has remained in the working circuit, wherein the selected temperature value corresponds to a selected braking moment.

2. The hydrodynamic retarder of claim 1, in which the retarder operates with controlled pressure, wherein said control valve comprises a continuously adjustable 3/2-way valve, and including a bypass line for short-circuiting the working circuit in order to circumvent the heat exchanger.

3. The hydrodynamic retarder of claim 1, in which said retarder is operational with direct moment control independent of pressure, and wherein said control valve is a continuously adjustable 2/2 way valve.

4. Hydrodynamic retarder for a vehicle with a primary part having an input end connectable to a transmission output shaft of the vehicle and an output end connectable to an axle drive shaft of the vehicle, and with a fixed secondary part which relative to the primary part is sealed against fluid discharge, with the primary part and secondary part being under formation of a working space provided with feed lines and drain lines while forming a working circuit in which a working medium flows, with a cooling circuit carrying the cooling volume flow, with a heat exchanger incorporated in it and, with additional cooling- and energy-storing capacities, moreover with a control valve for controlling the volume flow in the outlet line, characterized in that:

(a) a temperature sensor is provided for sensing the temperature of the working medium contained in the working circuit;

(b) a control system coordinated with the control valve is provided for adjusting by means of the cooling volume flow passed to the heat exchanger a set temperature value of the working medium which has remained in the working circuit; and (c) the set value of the temperature is so selected that it corresponds to a specific, desired braking moment.

* * * * *